United States Patent
Mackin

(10) Patent No.: US 10,198,415 B2
(45) Date of Patent: Feb. 5, 2019

(54) WEBFORM MONITORING

(71) Applicant: Threeword Limited, Manchester (GB)

(72) Inventor: Alan Owen Mackin, Manchester (GB)

(73) Assignee: Formisimo Limited, Manchester (GB)

( * ) Notice: Subject to any disclaimer, the term of this patent is extended or adjusted under 35 U.S.C. 154(b) by 55 days.

(21) Appl. No.: 14/204,273

(22) Filed: Mar. 11, 2014

(65) Prior Publication Data

US 2014/0258829 A1    Sep. 11, 2014

(30) Foreign Application Priority Data

Mar. 11, 2013    (GB) .................................. 1304315.3

(51) Int. Cl.
| | | |
|---|---|---|
| *G06F 17/00* | (2006.01) | |
| *G06F 17/24* | (2006.01) | |
| *G06F 11/34* | (2006.01) | |
| *G06F 17/30* | (2006.01) | |

(52) U.S. Cl.
CPC ........ *G06F 17/243* (2013.01); *G06F 11/3438* (2013.01); *G06F 17/3089* (2013.01); *G06F 2201/875* (2013.01)

(58) Field of Classification Search
CPC ......... G06F 21/34; G06F 21/32; G06F 17/243
USPC ................. 715/200, 234, 221–225
See application file for complete search history.

(56) References Cited

U.S. PATENT DOCUMENTS

| | | | | |
|---|---|---|---|---|
| 6,185,583 | B1 * | 2/2001 | Blando ................. | G06F 17/243 715/210 |
| 7,054,509 | B2 * | 5/2006 | Rom ................... | G06K 9/00469 382/217 |
| 7,426,496 | B2 * | 9/2008 | Kristjansson ......... | G06F 17/243 706/10 |
| 8,156,420 | B2 * | 4/2012 | Nie ....................... | G06F 17/243 715/221 |

(Continued)

FOREIGN PATENT DOCUMENTS

| | | |
|---|---|---|
| WO | WO 2008/067316 A2 | 6/2008 |
| WO | WO 2008/096341 A1 | 8/2008 |

OTHER PUBLICATIONS

United Kingdom Intellectual Property Office, Search Report in United Kingdom Patent Application No. GB1304315.3 (dated Sep. 23, 2013).

*Primary Examiner* — Manglesh M Patel
(74) *Attorney, Agent, or Firm* — Leydig, Voit & Mayer, Ltd.; Gerald T. Gray

(57) ABSTRACT

A system for monitoring the performance of the webform comprising: a detection module, an archive module, a database, an analysis module and intervention module, a help module, and a reporting module. The detection module detects user interactions with the webform. The archive module stores details of the detected user interactions in the database. The analysis module compares detected user interactions with templates stored in the database. The analysis module determines a performance indication for the detected interactions. In response to a negative performance indica- (Continued)

Figure 1:
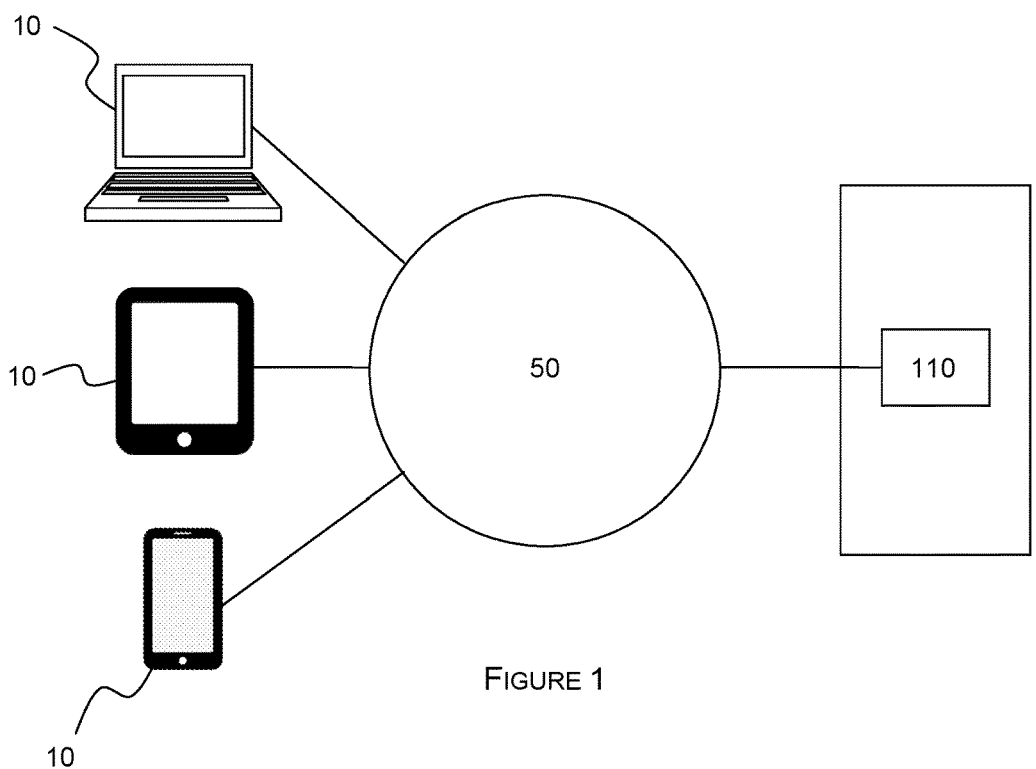

tion, the intervention module categorizes the performance indication by identifying a negative ratings value and activates the help module, which can activate additional functionality on the webform and/or provide a connection to additional data or devices. The reporting module generates reports based upon the data stored in the database.

17 Claims, 1 Drawing Sheet

(56) References Cited

U.S. PATENT DOCUMENTS

| | | | |
|---|---|---|---|
| 8,484,511 B2 * | 7/2013 | Tidwell | H04H 60/64 707/700 |
| 2009/0029336 A1 * | 1/2009 | Mangano | G09B 7/00 434/354 |

* cited by examiner

WEBFORM MONITORING

TECHNICAL FIELD OF THE INVENTION

The present invention relates to webform monitoring and in particular to real time monitoring of user interactions with webforms.

BACKGROUND TO THE INVENTION

In many areas of business a key point of contact with customers is a website. Many such websites will incorporate webforms comprising an interface operable to enable users to input requested data into particular fields. Typically such forms may be used to: enable the placing of an order, make a payment; register; create a user account; or request additional information.

Whilst many businesses invest considerable time and expense in the look of their website and other marketing material, the operation of webforms is often overlooked. This can be critical as a potential customer attracted by a carefully crafted marketing message or website may be put off further business with a company if they are unable to satisfactorily interact with a required webform. Typical issues with webforms include confusing layout, poor coordination with browser autofill operation, restrictive options for particular fields, inflexible format for data entry into particular fields (e.g. postcodes, addresses, telephone numbers, passwords or model/part numbers).

It is therefore an object of the present invention to provide a system and method for webform monitoring that at least partially overcomes or alleviates the above problems.

SUMMARY OF THE INVENTION

According to a first aspect of the present invention there is provided a system for monitoring a webform, the system comprising: a detection module operable to detect user interaction with said webform; an archive module operable to store details of the detected user interactions with said webform in a database; an analysis module operable to compare the detected user interactions with one or more templates stored in said database to determine a performance indication for the detected user interactions; and an intervention module operable in response to a negative performance indication to process the user interaction data, categorise the negative performance indication and thereby activate a corresponding help module.

According to a second aspect of the present invention there is provided a method of monitoring a webform, the method comprising the steps of: detecting user interaction with the webform; storing details of the detected user interactions in a database; comparing the detected user interactions with one or more templates stored in the database so as to determine a performance indication for the detected user interactions; and where the performance indication is negative, processing the user interaction data so as to categorise the negative performance indication and thereby activate a corresponding help module.

The present invention thus provides for real time monitoring of webforms and direct activation of a suitable help module in response to detection of poor performance.

The webform monitored by the system may be implemented by a webform module. The webform module may be implemented on any suitable platform. The webform module may be connected to or in communication with a user interface so as to enable user interaction with the webform.

In a preferred implementation, the webform module is implemented on a server in communication with a user device, wherein the user device provides the interface. in such instances, the user device may render the webform locally and may transmit data input during user interaction to the webform module via a suitable communication link. Suitable user devices include, but are not limited to: personal computers, laptop computers, tablet computers, smartphones, media players and the like. Suitable communication links may be wired or wireless and include, but are not limited to fixed line or cellular telephone networks, wired data connections, wireless data connections including WiFi, Bluetooth or similar. In an alternative embodiment, the webform module and the user interface may be provided on a dedicated terminal.

The system may be implemented on the same device as the webform or on one or more devices in communication therewith.

The detection module is preferably operable to detect user interaction with the user interface and transmit details of such interactions to the archive module. In particular, the detection module may be operable to detect: the identity of the webform, the type of device upon which the user interface is provided, the browser used for rendering the webform, which fields with a webform a user has interacted with, which fields have been auto filled by a browser or other application, which fields have been corrected by a user, which fields are omitted or erroneously filled, and what type of interaction has taken place with a field e.g. text/number entry, selection using a pointing device or touchscreen or the like. Detection of fields that are omitted or erroneously filled may be undertaken directly or may be undertaken by monitoring the response of the webform module. Detection of auto filled fields may be achieved by comparing user interactions with data contained in fields. Detection of fields requiring correction may be achieved by monitoring use of delete functions by a user. Preferably, the detection module is operable only to transmit details relating to the nature of user interactions detected. In this way no private user data is transmitted by the detection module. Preferably, the transmitted details are encrypted. Encryption may be achieved by use of any suitable technique.

The detection module may be in communication with or implemented on the device providing the user interface. This facilitates detecting user interactions directly.

The archive module may be operable to sort data for storage by webform identity, and or type of device/browser. The archive module may further be operable to associate particular webform identities with particular types of webform (e.g. registration, information order, purchase order or the like), other webforms operated by the same entity and/or particular business sectors (e.g. retail or type of retail (electrical, food, clothes etc), professional services, travel booking or the like). The archive module may subsequently be operable to generate and store webform performance templates. Performance templates may combine user interaction data from many separate interactions. In particular, this may involve calculating typical values for particular user interaction data parameters detected by the detection module. Typical values may be average values (whether mean, median or mode) or may be based on any other calculation.

Performance templates may be based on interactions with a single webform or may be based on interactions with a range of associated webforms. This can enable the generation of type, operator or sector performance templates.

Performance templates may be generated from all user interaction data from associated webforms. Alternatively, performance templates may be generated from a subset of detected user interactions with associated webforms. The subset may be based upon a fixed or moving temporal window or may be based on particular devices and/or browsers used for the interactions.

Performance templates may be updated substantially continuously. Where performance templates are updated continuously, periodically a time stamped instantaneous performance template may be stored. In some implementations, the analysis module may be operable to compare said stored performance templates against the present performance templates. This can provide information upon variation in performance over time.

The analysis module may be operable to compare user interactions with a webform detected on a single occasion with a template. Additionally or alternatively, the analysis module may be operable to compare user interactions detected on multiple occasions with a predetermined template. In the latter case, this may include user interactions at different times or may include a selection of the last n occasions. This can provide information on variation in webform performance over time.

The analysis module may be operable to generate a performance indication by determining whether particular user interaction data parameters detected by the detection module are better or worse than the typical value stored in the template. The analysis may further be operable to determine the absolute value of any difference between particular user interaction data parameters detected by the detection module and the typical value stored in the template in order to generate the performance indication. The performance indication may comprise a single rating value or a set of rating values corresponding to each user interaction data parameter in the template. The rating values may be constrained to a plurality of predetermined values or may be free to vary substantially continuously.

The analysis module may be operable to store performance indications in the database.

The intervention module may be operable to categorise the performance indication by identifying one or more negative ratings values within a set of ratings values. In such cases classification may involve determining the most negative ratings value. In some instances, where there is more than one negative ratings value, the intervention module may be operable to make a multiple classification.

The activated help module may be selected from a plurality of available help modules. Suitable help modules may include, but are not limited to: an auto correct module operable to highlight and or correct spelling mistakes or format errors; a live chat module enabling communication with a human assistant; a demonstration module provide text, audio or video instructions in relation to particular fields; a function module operable to enable or disable webform fields or functions; an incentive module operable to retrieve and output to the user text, audio or video information related to the web form provider or a product or service selected by the user during interaction with the webform.

The system may be provided with a reporting module. The reporting module may be operable to generate reports upon the monitoring of particular webforms. The reports may contain bulk details and/or individual details of detected user interactions. In particular, the reports may comprise one or more representations of performance indications overall or in relation to different parameters.

DETAILED DESCRIPTION OF THE INVENTION

Figure 2:
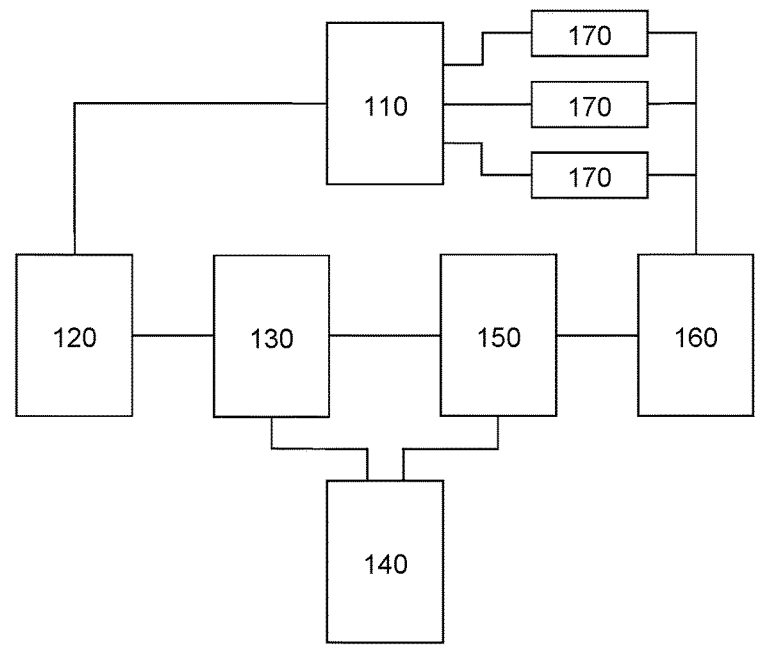

In order that the invention may be more clearly understood an embodiment/embodiments thereof will now be described, by way of example only, with reference to the accompanying drawings, of which:

FIG. 1 is a schematic block diagram illustrating the typical devices involved in interacting with a webform; and FIG. 2 is a schematic block diagram of a system according to the present invention for monitoring a webform.

Turning now to FIG. 1, in many instances potential customers (users) will interact with a business via a website, and in particular a webform. Typically, a user device 10 (such as a computer, tablet, smartphone or media player) will contact a server 100 hosting the webform via a data connection 50. The webform will subsequently be rendered by the device 10 so as to enable a user to enter data into the fields provided. The data can subsequently be transmitted back to the server for processing by the business. The webform functions may be implemented by a webform module 110, being part of the server or being connected to the server.

In the present invention, as is illustrated by FIG. 2, a system is provided for monitoring the performance of the webform. In particular, the system comprises a detection module 120, an archive module 130, a databases 140, an analysis module 150 and intervention module 160, one or more help modules 170, and a reporting module 180.

The detection module 120 is operable to detect user interaction with the webform taking place via the user device. Typically this might involve detecting key strokes, selection of fields, deletion or editing of data or the like and transmitting details of these interactions to the archive module. To facilitate this, the detection module may comprise code served to the user device 10 along with or as part of the webform.

The detection module 120 is primarily operable to detect the type of user interaction rather than the exact data. This can reduce the mount of data for transmission and subsequent processing. It can also ensure that any sensitive user data is not transmitted, simplifying data protection and privacy issues.

The archive module 130 is operable to store details of the detected user interactions in the database 140. The user interactions are first sorted by webform identity, device type and browser type before being stored. The webform identity may allow it to also be associated with a larger class of webforms of the same type, operated by the same business entity or aimed at the same business sector. As more user interactions are detected, the archive module can combine data from multiple interactions to generate typical performance templates for particular webforms either generally or sorted by browser/device type. Similarly, the user interaction data along with the association data may be used to generate performance templates based on type of webform, operating entity or business section. The generated performance templates are also stored in the database 140.

The analysis module 150 is operable to compare detected user interactions with one or more of the templates stored in the database 140. Based on this comparison, the analysis module 150 may determine a performance indication for the detected interactions. The performance indication may be stored in the database for future reference. The performance indication may be a single rating value or a set of rating values corresponding to how the detected interaction differs from the template to which it was compared.

The intervention module 160 is operable in response to the performance indication. If the performance indication is positive, the intervention module 160 takes no action. If the performance indication is negative, the intervention module 160 categorises the performance indication by identifying one or more negative ratings values. Subsequently, based on the categorisation, the intervention module 160 activates one or more help modules 170. The help modules 170 can activate additional functionality on the webform and/or provide a connection to additional data or devices.

By activating the appropriate help module, the intervention module 160 can potentially ensure that a struggling form user completes a webform satisfactorily. This can therefore 'save' a potentially lost customer for a business.

As an example, if it appears from the detected information that a user is struggling to fill in a webform, a livechat help module 170 may be enabled. This could enable to user to receive help and thus complete the form. Alternatively, an incentive type help module may be activated whereby additional information is displayed to the user. As an example, on a retail webform, the incentive type module might display to the user images of or information about the numbers of a particular product that have been ordered and/or delivered to a users post code area in a recent time interval; or in the case of a professional services webform, the incentive type module might display to the user images of or information about recent clients or successes.

As further examples, the help modules 170 may be operable to enable or disable functions of the webform or the browser rendering the webform. In particular, if it is detected that the user is repeatedly deleting or correcting auto filled text, the help module may be operable to cause the webform module to inhibit auto fill. Additionally or alternatively, if a particular field in a webform is causing difficulties, the help module may be operable to disable the field or substitute an alternative version of the field form a different webform or earlier version of the webform.

The reporting module 180 is operable to generate reports based upon the data stored in the database 140. This can allow a webform operator or other parties connected with the monitoring system to review the webform performance. The reporting module 180 may be operable to generate reports either in hard copy formats or more preferably in an interactive format optimised for on screen display. The reports can allow the webform operator to develop an understanding of where users have difficulty interacting with their webform. The reports can also indicate if problems are resolved or created by any updates to the webform.

It is of course to be understood that the invention is not to be restricted to the details of the above embodiment which is described by way of example only. Many variations are possible without departing from the scope of the invention.

The invention claimed is:

1. A method of monitoring a webform, the method comprising the steps of:
   detecting user interactions with a webform rendered on a browser or other application on a display of a user device;
   storing details of the detected user interactions in a database, wherein the details of the detected user interactions comprise user interaction data parameter values;
   generating one or more performance templates based on the browser and/or a type of the user device by combining data from previous user interactions with the webform;
   comparing the detected user interactions with the one or more performance templates by comparing user interaction data parameter values with corresponding typical user interaction data parameter values determined using all or a subset of the previous user interactions with the webform and/or with a range of associated webforms, said typical user interaction data parameter values being stored in the one or more performance templates, to determine a performance indication for the detected user interactions, the performance indication comprising one or a set of ratings values; and
   when the performance indication is negative, processing the user interactions to categorise the negative performance indication by identifying one or more negative ratings values within the one or the set of ratings values of the negative performance indication and thereby activate a corresponding help module and modify the display to present the corresponding help module.

2. A method as claimed in claim 1, wherein detection of fields that are omitted or erroneously filled is undertaken directly or by monitoring the response of a webform module operable to implement the webform.

3. A method as claimed in claim 1, wherein detection of auto filled fields is achieved by comparing user interactions with data contained in fields.

4. A method as claimed in claim 1, wherein detection of fields requiring correction is achieved by monitoring use of delete functions by a user.

5. A method as claimed in claim 1, wherein data for storage is sorted by webform identity, and/or type of device/browser/other application.

6. A method as claimed in claim 5, wherein particular webform identities are associated with particular types of web form, other webforms operated by the same entity and/or particular business sectors.

7. A method as claimed in claim 1, wherein the performance templates are based on interactions with a single webform.

8. A method as claimed in claim 1, wherein the performance templates are updated substantially continuously.

9. A method as claimed in claim 1, wherein user interactions with a webform detected on a single occasion are compared with a performance template.

10. A method as claimed in claim 9, wherein the performance indication is generated by determining whether particular user interaction data parameters detected by the detection module are better or worse than a typical value stored in the template.

11. A method as claimed in claim 10, wherein the performance indication comprises a single rating value.

12. A method as claimed in claim 10, wherein the performance indication comprises a set of rating values corresponding to each user interaction data parameter in the template.

13. A method as claimed in claim 12, wherein the performance indication is classified by identifying one or more negative ratings values within a set of ratings values.

14. A method as claimed in claim 1, wherein performance indications are stored in the database.

15. The method of claim 1,
   wherein the corresponding help module includes one of:
   an auto correct module operable to highlight and or correct spelling mistakes or format errors;
   a live chat module enabling communication with a human assistant;
   a demonstration module operable to provide text, audio or video instructions in relation to particular fields;

a function module operable to enable or disable webform fields or functions; and an incentive module operable to retrieve and output to the user text, audio or video information related to the web form provider or a product or service selected by the user during interaction with the webform.

16. A method as claimed in claim 1, wherein the method includes generating reports upon the monitoring of particular webforms.

17. A method as claimed in claim 1, wherein the method includes detecting: an identity of the webform, a type of device upon which the webform is rendered, the browser or other application used for rendering the webform, which fields within the webform a user has interacted with, which fields have been auto-filled by the browser or other application, which fields have been corrected by a user, which fields are omitted or erroneously filled, and what type of interaction has taken place with a field including text/number entry and selection using a pointing device or touchscreen.

\* \* \* \* \*